United States Patent [19]

Hurst et al.

[11] Patent Number: 5,710,716
[45] Date of Patent: Jan. 20, 1998

[54] VEHICLE LOAD MEASURING SYSTEMS

[75] Inventors: David Charles Hurst, West Midlands; Kenneth Vincent, Alcester; James Henton Wilson, West Midlands, all of United Kingdom

[73] Assignee: Lucas Industries Public Limited Company, West Midlands, England

[21] Appl. No.: 571,233

[22] Filed: Dec. 12, 1995

[30] Foreign Application Priority Data

Dec. 23, 1994 [GB] United Kingdom ............... 9426220

[51] Int. Cl.$^6$ ................ G01G 19/40; G01G 19/02
[52] U.S. Cl. ............ 364/508; 364/463; 364/571.01; 177/25.14; 177/136
[58] Field of Search ............... 364/508, 463, 364/571.01, 571.02, 571.03–571.08; 73/800, 728; 177/25, 136, 210, 21, 25.14, 25.18, 25.11

[56] References Cited

U.S. PATENT DOCUMENTS

| | | | |
|---|---|---|---|
| 4,374,362 | 2/1983 | Sutherland et al. | 328/162 |
| 4,535,854 | 8/1985 | Gard et al. | 177/1 |
| 4,649,490 | 3/1987 | Manduley et al. | 364/466 |
| 4,691,290 | 9/1987 | Griffen | 364/567 |
| 4,832,141 | 5/1989 | Perini et al. | 177/141 |
| 5,478,974 | 12/1995 | O'Dea | 177/25.14 |
| 5,515,737 | 5/1996 | Imani et al. | 73/862.623 |

FOREIGN PATENT DOCUMENTS

| | | |
|---|---|---|
| 0 225 118 | 6/1987 | European Pat. Off. |
| 0 423 622 | 4/1991 | European Pat. Off. |
| 2 215 469 | 9/1989 | United Kingdom |

Primary Examiner—Emanuel T. Voeltz
Assistant Examiner—Demetra R. Smith
Attorney, Agent, or Firm—Oblon, Spivak, McClelland, Maier & Neustadt, P.C.

[57] ABSTRACT

A system for measuring loads in a vehicle comprising strain and/or displacement sensing elements and a local electronic interface which are adapted to be linked to a main electronic unit in a vehicle with which the load measuring system is associated. The load measuring system comprises an internal micro-controller within the interface which is adapted to receive signals from the main electronic unit to switch elements of the load measuring system into both zero setting and calibration modes. The micro-controller has electrically alterable, non-volatile memory which is adapted to store zero setting and calibration data for subsequent use in a normal operating, load measurement mode of the system.

19 Claims, 4 Drawing Sheets

VEHICLE LOAD MEASURING SYSTEMS

The present invention is concerned with systems for measuring loads in vehicles, such as the loads measured in load transducers disposed in the couplings between the tractor and trailer vehicles.

Such load measuring systems for vehicle applications, such as coupling force sensing, are required to operate and survive in an arduous environment. This dictates that the sensors and associated interface arrangements should be in close proximity and ideally, be sealed as a single, totally enclosed package which has the minimum number of external connections linking it with a main electronic control unit on the vehicle.

Such systems have problems of calibration in regard to both zero setting and calibration modes. It is known in the prior art to use external equipment to generate a single calibration process which is not repeatable during normal vehicle operation. Such equipment does not meet the desired requirement of zero adjustment and calibration on the vehicle during its operation where inputs for zero cannot be controlled and where it would be desirable for the process to be repeated periodically.

It is an object of the present invention to overcome the aforegoing disadvantages of known systems.

In accordance with the present invention, there is provided a load measuring system using strain or displacement sensing elements and a local electronic interface which are adapted to be linked to a main electronic unit in a vehicle with which the load measuring system is associated, the load measuring system comprising an internal microcontroller within said interface which can be signalled from the main electronic unit to switch elements of the load measuring system into both zero setting and calibration modes, the micro-controller having electrically alterable, non-volatile memory which is adapted to store zero setting and calibration data for subsequent use in the normal operating (load measurement) mode of the system.

Preferably, the strain or displacement sensing elements and the local electronic interface are commonly located in a sealed enclosure.

Preferably, adjustments to the operation of the interface can be made by way of an internal microcontroller which operates digitally and which receives signals from a sensor amplifier via an analogue to digital converter, the microcontroller being adapted to adjust sensor offset by introducing a counterbalancing voltage into the input of said sensor amplifier by way of some form of digital to analogue converter and to adjust internal zero setting by short-circuitry the sensor output to generate a zero input condition to said sensor amplifier, the process of reading of said analogue to digital converter in the microcontroller being in the zero input condition being stored in non-volatile memory for use in deriving zero corrected figures for subsequent measurements.

In one embodiment, the zero load condition is directed by an associated external ECU micro-controller of the main electronic unit which generates the zero command signal by deduction from measurements being made and at a different time relays a calibration command which is signalled to the interface micro-controller in response to an external input to the main ECU micro-controller which also relays the calibration information.

The interface microcontroller will also control the sensor signal span after correcting for variations in energisation voltage, by multiplying input measurements by a fixed calibration factor which is adjusted automatically when the calibration mode is entered and a signal is sent from an external source, which may be the main ECU microcontroller, to the interface micro-controller to indicate the load being applied to the sensing system, to give a correctly scaled output hereafter the calibration factor is stored in the interface non-volatile memory and used in all subsequent measurements.

Setting for zero and calibration can be stored in a non-volatile memory associated with the interface microcontroller and remain in force until-zero set and calibration modes are re-entered in response to measurement conditions or external stimulus, at the end of which procedure, the new parameters generated are over-written into said non-volatile memory or are written into new locations and a pointer adjusted to point to said new locations.

The interface electronic drift is preferably corrected automatically at regular intervals set by program in the local micro-controller, by clamping the sensor output voltage to zero with an electronic switch and storing the zero output voltage after conversion into digital information, and referring all subsequent measurement to this stored zero level.

In another embodiment, two load measuring channels are associated with a single micro-controller and interface package in which a single bi-directional data transmission line provides external communication of two output signals which are represented in parameters of a pulse train produced by the micro-controller in a predetermined coded serial format.

Advantageously, the dual channel data is represented in a simple repetitive pulse train by the respective mark and space widths of this pulse train.

The signal line can also carry sensor system commands, the changeover to the command mode being effected remotely, preferably in the main ECU which receives and acts on the sensor signal pulse sequence by clamping this signal line to a pre-set level for a period, at which point the output signal being suppressed causes a changeover to an input mode at the interface micro-controller, so as to receive said external command signals.

In some embodiments, the two measurements are made from separate sensors and are combined to produce the required two output signal data by processing the analogue signals to form sum and difference signals and amplifying the resulting voltages by pre-set gain amplifiers in which the gain levels may not be equal but depend on the amplitude of expected sum and difference voltages.

In other embodiments, the abovementioned two analogue signals which are processed are one original sensor signal and the difference signal and the second original signal is derived from the converted load signal and the converted difference signal.

Alternatively, each of the two sensor signals can be amplified and converted without combination, with the processing of sum and difference signals being performed digitally within the interface micro-controller, in which case individual zero and calibration figures are stored for each of the two sensor signals.

In a still further arrangement, the two sensor signals are produced by a combination of primary and secondary input forces and a calibration process makes measurement of each force component individually in turn and then in combination, the local micro-controller processing any changes in output resulting from mutual interference, to develop cross-talk coefficients which are stored in the associated non-volatile memory and used to correct the primary and secondary measurements on subsequent readings.

Advantageously, the primary and secondary input forces are bi-directional and each has two calibration factors which are selected by the sensed direction of the two input forces and there are provided a total of four cross-talk coefficients, again selected as appropriate, by input force directions, to correct each subsequent measurement.

In one preferred arrangement, the micro-controller sets the measurement span by control of the bridge energisation voltage through a second Digital-Analogue converter where for normal measurements the energisation voltage is held at a level set during a prior calibration process wherein the energisation level was set to give a measurement output reading after analogue processing, corresponding to the known actual load which has passed to the interface microcontroller via external digital data transmission and the digital data which sets the energisation level is stored within the non volatile memory of said interface micro-controller.

In another preferred arrangement, the micro-controller sets the measurement span by control of the digital input to a multiplying D/A converter arranged in the analogue signal path at a point which produces a reasonably high level output, so as to present a calibrated analogue output with the digital input being stored during a calibration phase.

By virtue of the present invention, there is enabled the provision of a load measuring system having an internal interface microcontroller which is signalled by serial communications to perform zero setting and calibration routines, the results being stored in non-volatile memory for use in subsequent measurements in accordance with a repeatable operation.

The invention is described further hereinafter, by way of example only, with reference to the accompanying drawings, in which.

In general, the present system solves the abovedescribed problems of the prior art by the use of digital operation and local intelligence incorporated within the interface, which is able to switch the subsystem into both zero setting and calibration modes as described hereinafter. A microcomputer used in the system is equipped with electrically alterable permanent memory which is able to store areas of zero setting and calibration data for use in the normal operating mode.

Figure 1:
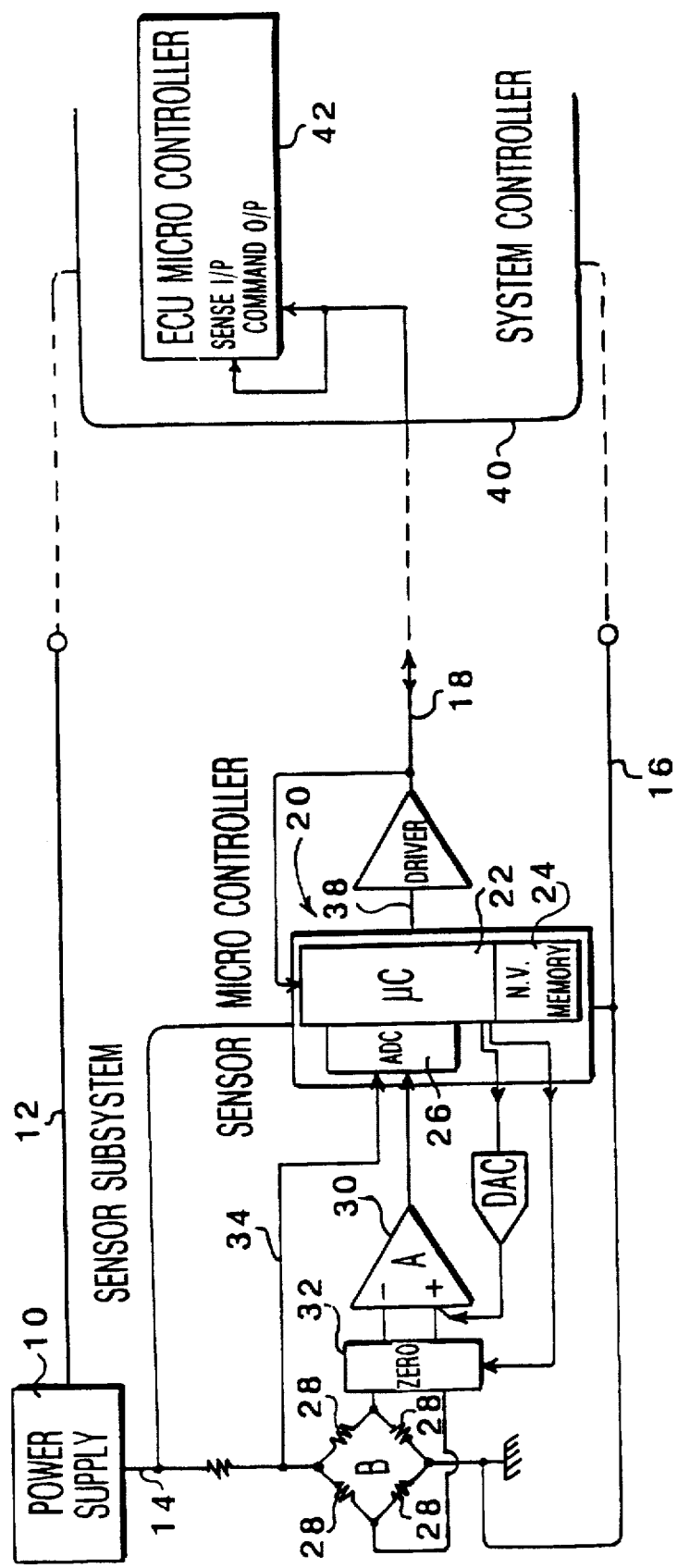
FIG. 1 is a block circuit diagram of one embodiment of a load sensor subsystem in accordance with the present invention, showing its connections with a main system controller of the vehicle which contains an ECU microcontroller.

FIG. 1 shows in schematic form a first example of such a "smart" load measuring system which has an internal power supply 10 operating from the vehicle battery (not shown) via a voltage line 12 to generate a local stabilised supply on its output line 14 for the sensor and interface circuit.

The only vehicle system connections required are the dedicated supply line 12, a ground link 16 and a signal line 18 designed for two-way information passage.

The sensor sub-system has a micro-controller 20 which includes a micro-computer 22 having electrically erasable non-volatile memory 24 and a multi-channel analogue-digital converter 26. The sensor sub-system also has a bridge arrangement B which, in the preferred embodiment illustrated, comprises a number (4) of strain-gauges 28 sensitive to applied load and which feeds the input of an amplifier 30 via a zero-setting element 32. When this amplifier produces a high level output, this is read by the A/D converter 26, along with the bridge supply voltage (via a line 34) developed by the power supply 10. The local micro-controller 20 provides two digital output signals, one to a Digital to Analogue converter 36 which gives a controlled level of offset voltage into the signal amplifier 30 and a main output signal on a line 38 which is conveniently made into a pulse signal in which the pulse width represents the channel measurement. This is an alternative to providing an analogue output signal by using a second digital-analogue converter (not shown), which has the benefit for vehicle systems of high noise immunity.

The abovedescribed sensor sub-system is designed to be embedded in the sensed mechanical member and is totally sealed when built, so that adjustments made after manufacture and subsequently in the field are performed by electronic signalling from a system controller 40 in the vehicle which reads the sensor output on line 38 (18) and provides commands to calibrate zero and span under various test conditions which can be applied during manufacture and in the field. In "end of build testing", of course, the appropriate signals may be provided by an ECU simulator which is incorporated into a loading control test-rig.

In either case, the calibration process takes place in three parts: (1) the setting of the input amplifier 30 zero, (2) the setting of the gauge zero, and (3) the calibration of the gauge span (normally in the latter order). However, it is not necessary to perform all three of these operations each time the calibration mode is entered and, for example:

Part (1) is usually performed regularly during vehicle operation

Part (2) is usually performed at service intervals when the vehicle is unladen and level; and Part (3) is usually performed less frequently with a known load applied, for example on a weigh bridge.

Considering each part of the calibration process in turn, the sensor micro-controller 20 co-operates with a main ECU micro-controller 42 in the vehicle system controller 40 to enter the appropriate calibration mode. This is signalled by the main ECU 42 which clamps the communication line 38 (18) low for a short period which is recognised by the sensor micro-controller 20 as a loss of response and it is then caused to enter a receive mode to accept a command message and possibly data from the main ECU 42. The first part of the process is however completed regularly during normal operation and is optionally instigated by the sensor micro-controller since no external conditions have to be satisfied and the process can be performed with minimal interruption to the measurement cycle. Such an amplifier zero setting is performed every few minutes and this can be based on an internal time (not shown) or can be signalled from the main ECU 40. On receipt of the preferred interval time pulse, the sensor circuit produces a fixed timing of pulse on line 38 for measurement at the main ECU 40, whilst it performs the amplifier zero operation. This is achieved by closing a switch in the element 32 to short circuit the output of bridge 3 and generating a zero input condition to the differential signal amplifier 30. The amplifier output signal, which should be zero in the ideal case, is non-zero if drift has occurred. This reading is sampled in the analogue-digital converter and is stored in the sensor interface memory, with all subsequent readings referenced to this level before being output as zero corrected figures.

Operation 2 of the calibration is always undertaken under static vehicle conditions as directed by the main ECU micro-controller 42 which senses the absence of load signals being applied to the measuring system and of any movement. In some circumstances, this ECU 42 may receive external service signals which initiate a general re-zero operation when the vehicle is totally unladen, on level ground and static as described in our earlier patent EP0246791.

This allows any drift signal from the sensing element B to be removed from the input amplifier 30 by the injection of a balancing voltage supplied by the sensor ECU 22 via the digital-to-analogue converter (DAC) 36 into the + input of amplifier 30; this DAC signal is adjusted so that any sensor output is corrected and ECU 22 reads the correct zero signal input voltage equal to that which was sensed when the input switch was closed, i.e. the amplifier 30 is set to the expected zero signal condition. This zero is effected in software which adjusts an output member to the DAC so as to achieve the correct offset injection and this input circuit adjustment maintains the amplifier dynamic output range even in the event of larger sensor drifts. The DAC drive data is stored in NVRAM 24 which may be EEPROM or EAPROM and is maintained thereafter until the next gauge re-zero operation. It is possible with a large NVRAM to stack the correction levels used by employing a pointer to the current location, which is also stored in NVRAM and this allows a record to be kept of the sensor drift which has occurred.

Span calibration is performed by external stimulus via the main ECU 42 (or its simulated equivalent) since this involves the application of a particular load to the measuring system. The load may be a calibration weight or a regulated force applied to a particular point on the vehicle or could be an arbitrary load applied to the vehicle when it is standing on a weigh bridge, thereby allowing the measurement of said load through the recorded increase in total axle or vehicle weight. In all cases, the actual load value applied must be input into the ECU 42 via a diagnostic input (not shown) and this same value is passed on to the sensor ECU 22. The sensor reading is then made and the calibration factor is obtained by dividing the latter reading by the applied load and storing the result in the NVRAM 24. All subsequent readings are multiplied by this calibration factor before being passed to the main ECU 42 after suitable known scaling.

Figure 2:
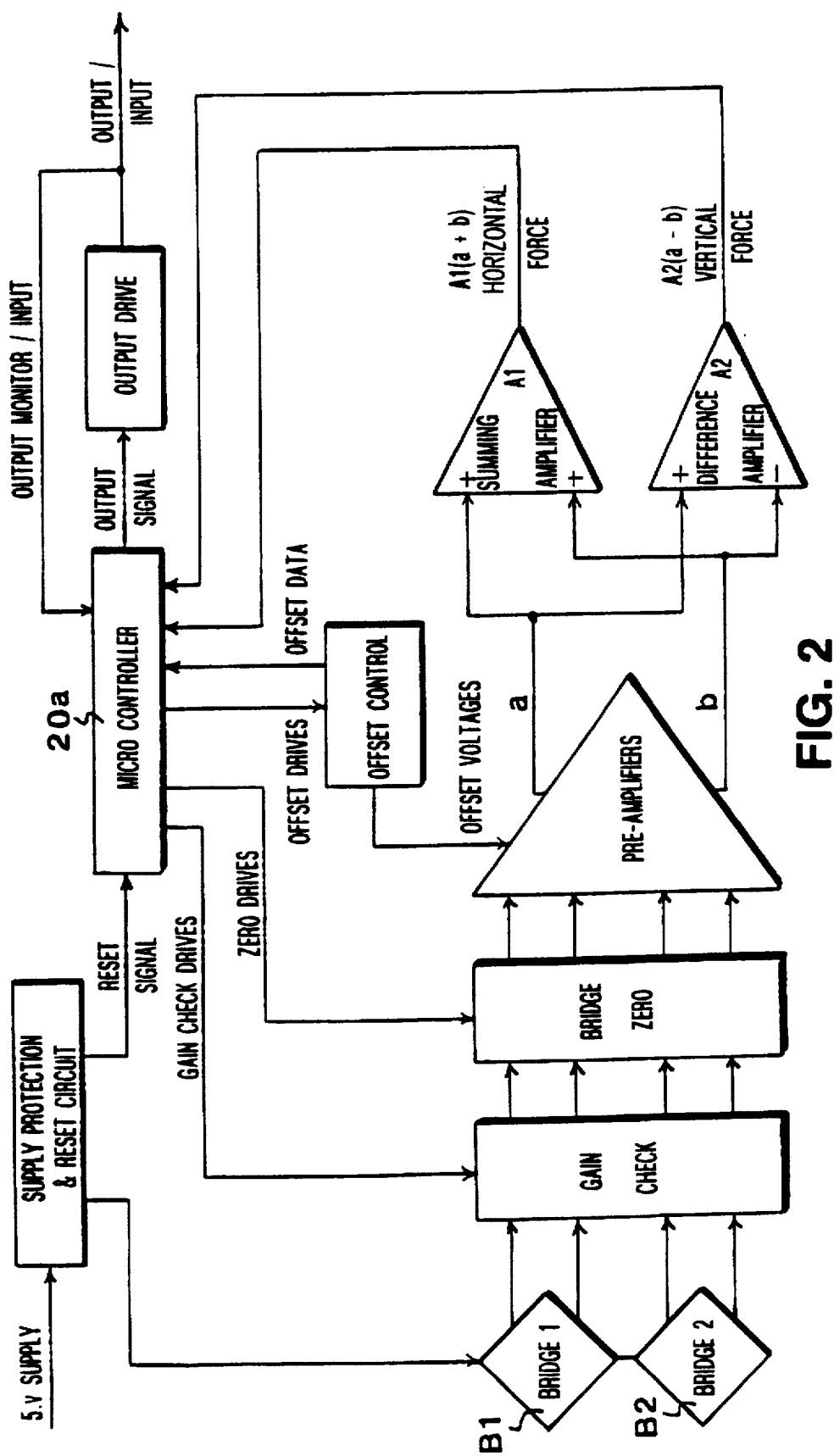
FIG. 2 is a block circuit diagram of a modified load sensor subsystem in the form of a 2-channel system.

FIG. 2 shows a more sophisticated version in the form of a two-channel system in which the single micro-controller 20a performs the functions previously described but for two sensors B1 and B2 which are associated, in the preferred embodiment, with the same measurement as will be explained hereinafter. However, the two channels could equally well be independent with a simple modification to the connections between the pre-amplifiers and processing amplifiers of FIG. 2. The preferred embodiment embraces the measurements required in a particular load sensing task wherein it is necessary to measure the sum and difference of two sensor output signals in order to generate horizontal (primary) and vertical (secondary) load readings in a particular structure. FIG. 2 shows the provisions of FIG. 1 applied to this task where the preamplifier signals from individual sensors B1 and B2 are further processed and, where necessary, additionally amplified to produce sum and difference signals. The process generates output signals, suitably scaled so that for example, the difference signal is amplified to create a large analogue signal which retains good resolution when converted to a number by the A/D converter. The gain of the difference amplifier is set by the expected maximum differential signal produced or that level required to be measured. The A1 (a+b) and A2 (a−b) processed analogue signals are taken into the micro-controller 20a via two A/D conversion channels (not shown) and are stored and further processed within the digital micro-controller before being used to provide the measurement output signals. An alternative to the sum and difference inputs being used in FIG. 2 can increase the resolution of the sum signal by removing the b signal (or the a signal) and increasing the gain of the 'summing' amplifier to $2A_1$. This generates a double resolution "a" signal when converted and the b signal can be derived in the micro-controller as follows:

Sum input $S=2A_1a$

Difference input $D=A_2(a-b)$ therefore $b=a-D/A_2$ $2A_1b=S-D(2A_1/A_2)$

Figure 3:
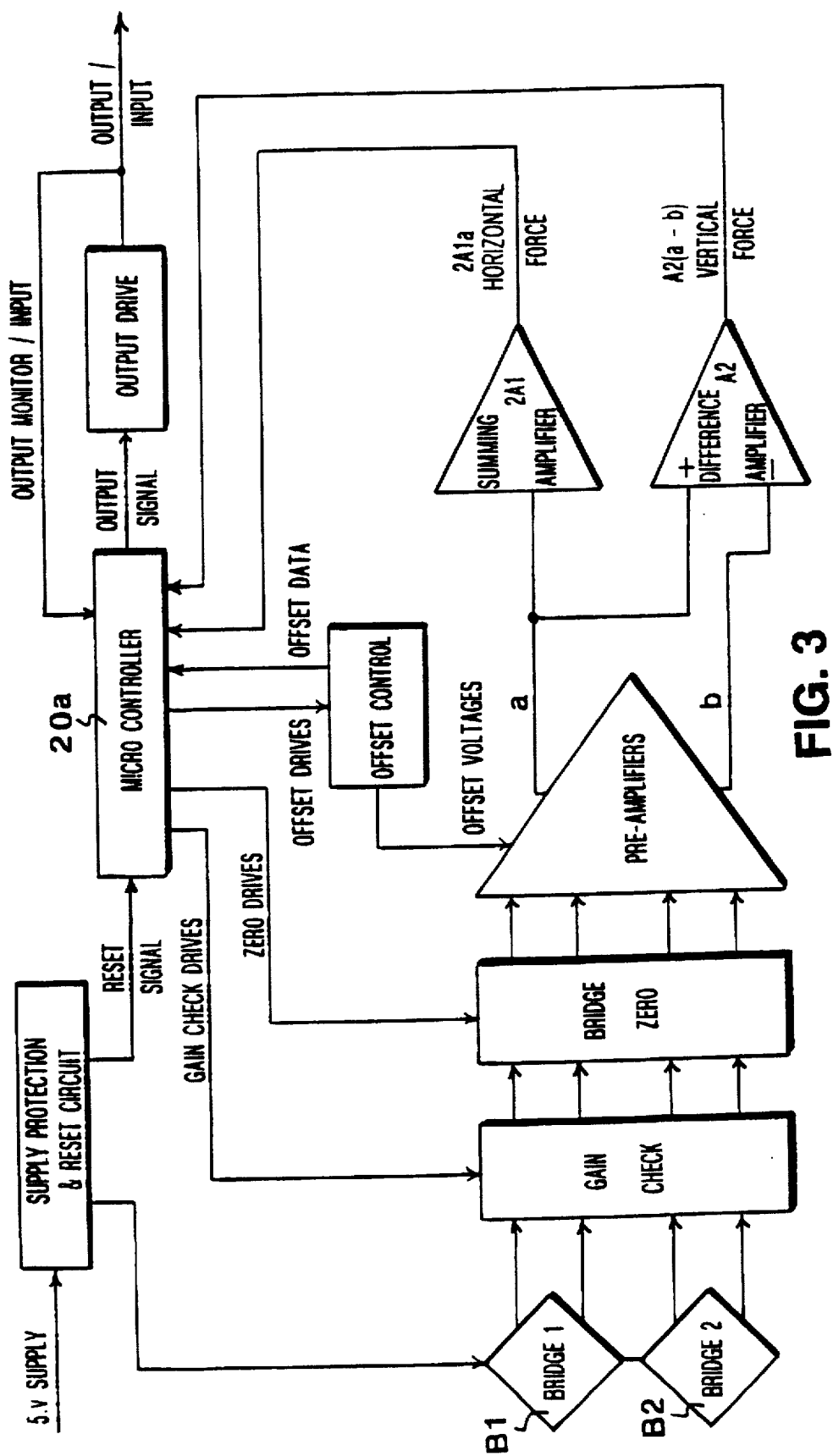
FIG. 3 is similar to FIG. 2 but showing the system under different operational conditions.

This produces 3 signals within the micro-controller $2A_1a$, $2A_1b$ and $A_2(a-b)$ The schematic is shown in FIG. 3 for micro-controller inputs of $2A_1a$ and $A_2(a-b)$.

If the difference signals are of a similar magnitude to the basic a and b signals, it may be preferable to apply signals $A_1a$ and $A_1b$ to the micro-controller inputs and process these signals internally to generate the difference signal.

This gives the advantage that calibration corrections can be made in software and can be changed automatically during a recalibration phase with predetermined loads applied to the structure. This would require the same circuit layout but the sum and difference amplifiers of FIG. 2 would become single input amplifiers of pre-set gain $A_1$.

When the required sensor output signals are only available by derivation from the basic sensor signals as described above, the simple sum and difference processing as described may generate errors due to slight differences in the sensing elements, their placing or the tolerance of mechanical dimensions at or around the sensor sites. The effect of these differences is generally seen when the application of a secondary input, which is sensed differentially, causes the increase in a, for example, to not be equal to the decrease in b, so that the sum (a+b) does not remain constant. This disturbance to the primary force measurement is known as cross-talk and an improvement in measurement accuracy is made by cross-talk correction. Conversely, reverse cross-talk occurs when, with a given secondary force input which is constant, changing the applied primary force disturbs the secondary force measurement. With the sensor arrangement described, the cross-talk corrections required are measured and stored within the micro-controller 20a.

A typical calibration procedure, as follows, can be undertaken on the mechanical structures installed with the sensor system on to a test rig capable of generating both primary forces and secondary forces (sum+difference). The measurement systems are zeroed under no load conditions as described hereinbefore. A high primary force is applied to a known level and primary input is calibrated. The primary input is removed and a pre-determined secondary input is applied and the secondary channel is calibrated. The secondary force is maintained and the primary force used for calibration is re-applied simultaneously. Both primary and secondary readings are taken and compared with the individual force calibration readings. Difference figures are derived which show the shift in calibration caused by simultaneous loading on the structure and measuring systems. After dividing each shift in calibration reading by the opposite applied force and forming a cross-talk coefficient, each subsequent set of readings are corrected as follows:

Primary load=Primary reading−Secondary reading×sec Ct coeff. Secondary load=Secondary reading−primary reading×primary Ct coeff.

Appropriate steps in the calibration procedure are repeated with the direction of the secondary force reversed in order to generate a second pair of cross-talk coefficients for the reversed secondary load direction which are stored and selected for subsequently corrected readings by sensing the direction of the secondary loading.

This technique also allows for dual calibration figures for the secondary force in either direction as well as dual Ct coefficients.

For structures in which the primary load can be in either direction, the calibration procedure described above will be repeated with the primary force direction reversed and a whole new set of calibration coefficients will be derived and stored. These again will be selected as a master decision based on the sensed direction of said primary force.

Reduction of wiring is an important feature of modern electronic systems and signal multiplexing is an accepted means of achieving this. The measuring system described uses a single transmission wire, preferably to carry two output signals for primary and secondary load measurements and to accept commands from a control computer to select the zero and calibration instructions and to accept load value data during the calibration processes as described above.

During normal operation, the measurement signals representing primary and secondary loads are output from the measuring system micro-controller 20 as a square wave of variable frequency. The mark and space durations tHPL and tLPL contain the measurement information as follows in one example:(i)

Primary value=$P_o \pm K_p P_m$ as the mark duration (ii) and Secondary value=$S_o \pm K_s S_m$ as the space duration.

Where $P_o$ and $S_o$ are preset constants for zero load, in μs. and $P_m$ and $S_m$ are the measurement pulse widths and $K_p$ and $K_s$ are scaling factors which have dimensions of μS/KN.

In one version of the measuring system, the commands for calibration are only accepted at or just after power is supplied to the interface electronics circuit and this mode signal is repeated at regular intervals to maintain the system in the calibration mode. This is a safety consideration which prevents the mode being entered or sustained when the vehicle is operating. During calibration, the load information from an external source is entered via the signal line so that calibration can be made with any suitable load which is available and can be measured by external means, such as a weigh-bridge, or is applied by an external hydraulic fixture.

Figure 4:
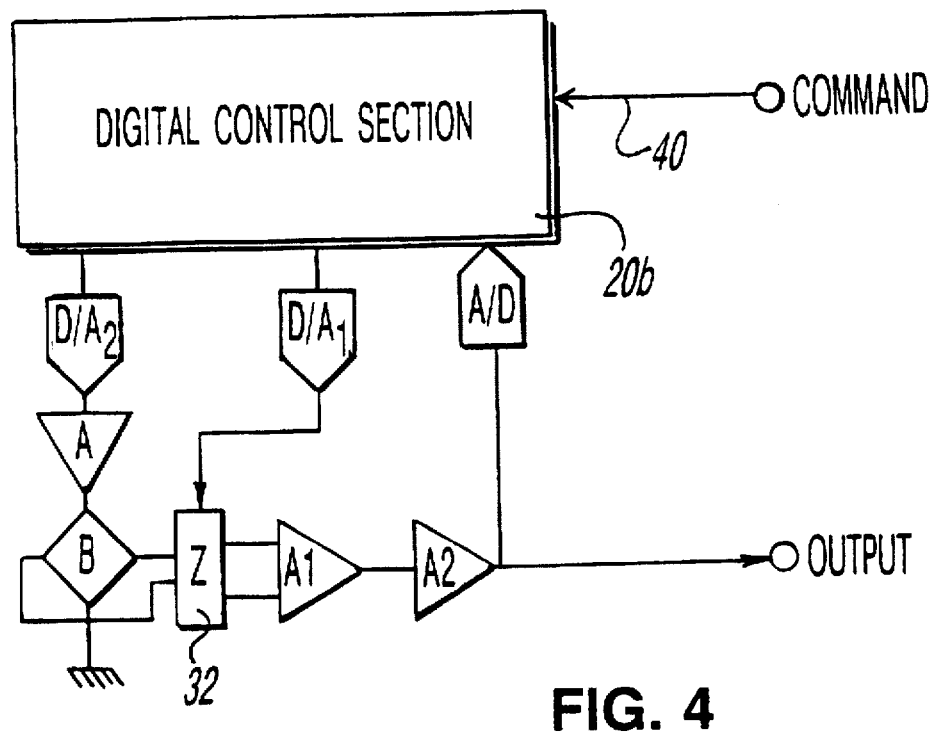
FIGS. 4 and 5 illustrate two different modifications to the system of FIG. 2.

An alternative version of the initially described load measuring system of FIG. 1 is shown in FIG. 4. This retains a digital element in which the process is controlled by signals transmitted from a main system ECU and in which zero and calibration figures are stored within a non-volatile memory, but the signal is not processed digitally within the interface electronics. This is done so that the signals can be presented as analogue voltages or currents to the system electronic controller in which of course, they may be converted into digital data.

FIG. 4 shows a measuring system block diagram which is not as economical of wiring as that previously described because non-multiplexed connections are employed since the arrangement has separate analogue signal outputs which offer processed signals wherein the process is controlled digitally from the local interface micro-controller 20b which receives command and calibration data from the system ECU via a digital line 40 which in this case does not transfer any measurement output data.

The digital control exercises control over the measurement process via two channels of Digital to Analogue conversion D/A, and D/A₂ which control zero and span. The zero adjustment is achieved by a compensating voltage injection as described hereinbefore except that in this case zero adjustment is made on command from the main system ECU when the sensor is in a zero load condition and the setting of the offset injection corrects both sensor and amplifier drift. The injection voltage is adjusted so that under the zero load conditions the output voltage is set to a pre-set zero level which may not be actual zero voltage.

Under calibration conditions, the output voltage is adjusted in the FIG. 4 arrangement by variation of the bridge voltage which is set by the D/A converter D/A₂ until the output voltage is set to the level corresponding to the load applied. This output voltage is monitored by the A/D converter feeding the controller within the interface, thereby allowing local setting of zero and calibration figures as selected by the main system ECU, and passed to the interface micro-controller along with signals which set the zero adjustment and calibration modes as described for the first system.

Figure 5:
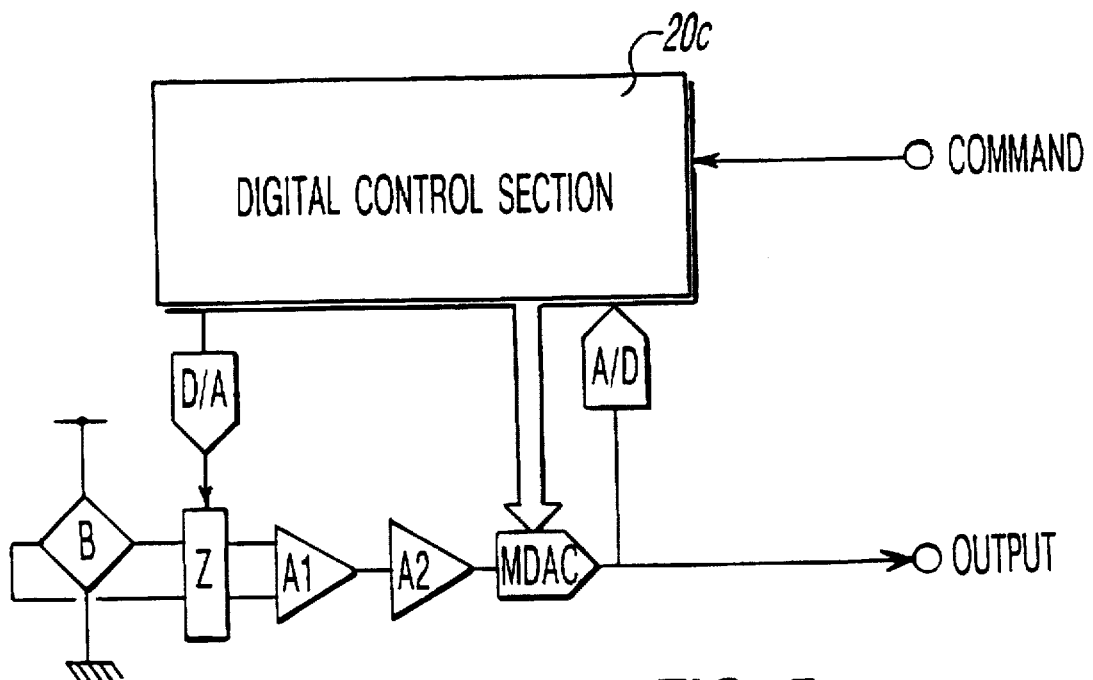

An alternative arrangement of the analogue processing channel which allows greater span of the calibration adjustment is illustrated in FIG. 5. This uses a fixed preset bridge voltage and adjusts the measurement gain in a multiplying D/A converter MDAC in which the multiplying factor is set by the local interface micro-controller 20c so as to generate a pre-set output signal in response to the application of a known load to the measuring system. This known load is signalled to the interface micro-controller by the main system controller which receives the data manually via a diagnostic input.

We claim:

1. A system for measuring loads in a vehicle comprising at least one sensing element selected from any of strain and displacement sensing elements and a respective electronic interface disposed locally to each said sensing element, said sensing element and said respective local electronic interface being adapted to be linked to a main electronic control unit disposed in a vehicle with which the load measuring system is associated at a location remote from said local interface, the load measuring system further comprising internal micro-controller means within said local interface which is adapted to receive signals from said main electronic control unit to switch elements of the load measuring system into both zero setting and calibration modes, said micro-controller in said local electronic interface having electrically alterable, non-volatile memory which is adapted to store zero setting and calibration data for subsequent use in a normal operating, load measurement mode of the system.

2. A load measuring system according to claim 1, wherein each said sensing element and the local electronic interface are commonly located in a sealed enclosure.

3. A system according to claim 1, wherein said local electronic interface includes an internal sensor amplifier means and wherein said internal micro-controller operates digitally and adjustments to the operation of the interface are made by way of said internal micro-controller which is arranged to receive signals from said internal sensor amplifier means via analogue to digital conversion means.

4. A system according to claim 3, comprising means within said internal micro-controller to adjust sensor zero offset by introducing a counterbalancing voltage into the input of said sensor amplifier means by way of a digital to analogue converter.

5. A system according to claim 3, comprising means within said local micro-controller to adjust said sensor amplifier zero setting by short-circuiting the sensor output to generate a zero input condition to said sensor amplifier means, the output of said analogue to digital conversion means in the zero input condition being stored in said non-volatile memory in said local micro-controller for use in deriving zero-corrected figures for subsequent measurements.

6. A system according to claim 5, wherein said zero input condition is directed by an associated external ECU micro-controller of said main electronic unit which generates a zero test command signal by deduction from measurements being made and at a different time relays a calibration command which is signalled to said local interface micro-controller in response to an external input to said main ECU micro-controller which also relays said calibration information.

7. A system according to claim 5, wherein said local interface micro-controller also has means to control sensor signal span after correcting for variations in energisation voltage, by multiplying input measurements by a fixed calibration factor which is adjusted automatically when a calibration mode is entered and a signal is sent from an external source to said interface micro-controller to indicate a prevailing load being applied to said sensing system, whereby to give a correctly scaled output, said calibration factor then being stored in said interface non-volatile memory for use in subsequent measurements.

8. A system according to claim 7 wherein said calculated settings for zero and calibration are stored in said non-volatile memory and remain in force until zero set and calibration modes are re-entered in response to either of measurement conditions and an external stimulus, at the end of which procedure, new parameters generated are either one of over-written into said non-volatile memory and written into new locations, with a pointer adjusted to point to said new locations.

9. A system according to claim 1, having means which automatically corrects electronic drift in the interface at regular intervals by clamping said sensor output voltage to zero with an electronic switch and storing said zero output voltage after conversion into digital form, and referring all subsequent measurement to this stored zero level.

10. A system according to claim 1 wherein two load measuring channels are associated with a single micro-controller and interface package in which a single bi-directional data transmission line provides external communication of two output signals which are represented in parameters of a pulse train produced by said local micro-controller in a predetermined coded serial format.

11. A system according to claim 10, wherein said dual channel data is represented in a simple repetitive pulse train by respective mark and space widths of this pulse train.

12. A system according to claim 10, wherein said data transmission line also carries sensor system commands, a changeover to the command mode being effected remotely in said main ECU which receives and acts on said sensor signal pulse sequence by clamping this data transmission line to a pre-set level for a period, at which point said output signal being suppressed causes a changeover to an input mode at said interface micro-controller, so as to receive external command signals.

13. A system according to claims 1, wherein two measurements are made from separate sensors and are combined to produce two output signal datas by processing respective analogue signals from said sensors to form sum and difference signals and amplifying the resulting voltages by pre-set gain amplifiers, whose gain levels need not be equal but depend on amplitude levels of expected sum and difference voltages.

14. A system according to claim 13, wherein said two analogue signals which are processed comprise one original sensor signal and the difference signal and the second original signal is derived from the converted load signal and the converted difference signal.

15. A system according to claim 1, wherein there are two measurement channels and each of the two sensor signals of said two measurement channels is amplified and converted without combination, with the processing of sum and difference signals being performed digitally within the interface micro-controller, individual zero and calibration figures being stored for each of the two sensor signals.

16. A system according to claim 1, wherein two sensor signals are produced by a combination of primary and secondary input forces and including a calibration means which makes measurement of each force component individually in turn and then in combination, said local micro-controller being arranged to process any changes in output resulting from mutual interference, whereby to develop cross-talk coefficients which are stored in said non-volatile memory and used to correct the primary and secondary measurements on subsequent readings.

17. A system according to claim 16, wherein primary and secondary input forces are bi-directional and each has two calibration factors which are selected by a sensed direction of said two input forces and there are provided a total of four cross-talk coefficients, again selected as appropriate, by input force directions, to correct each subsequent measurement.

18. A system according to claim 1, wherein said sensor comprises a bridge network and wherein said interface micro-controller is adapted to set measurement span by control of a bridge energisation voltage through a Digital-Analogue converter where for normal measurements said energisation voltage is held at a level set during a prior calibration process in which said energisation level was set to give a measurement output reading after analogue processing, corresponding to a known actual load which has passed to said interface micro-controller via external digital data transmission, and digital data which sets said energisation level is stored within said non-volatile memory of said interface micro-controller.

19. A system according to claim 1, wherein said micro-controller sets a measurement span of said sensor by control of a digital input to a multiplying D/A converter arranged in an analogue signal path at a point which produces a high level output, so as to present a calibrated analogue output with said digital input being stored during a calibration phase.

* * * * *